(No Model.)
R. BUTLER.
MOWER AND REAPER.
No. 354,500. Patented Dec. 14, 1886.
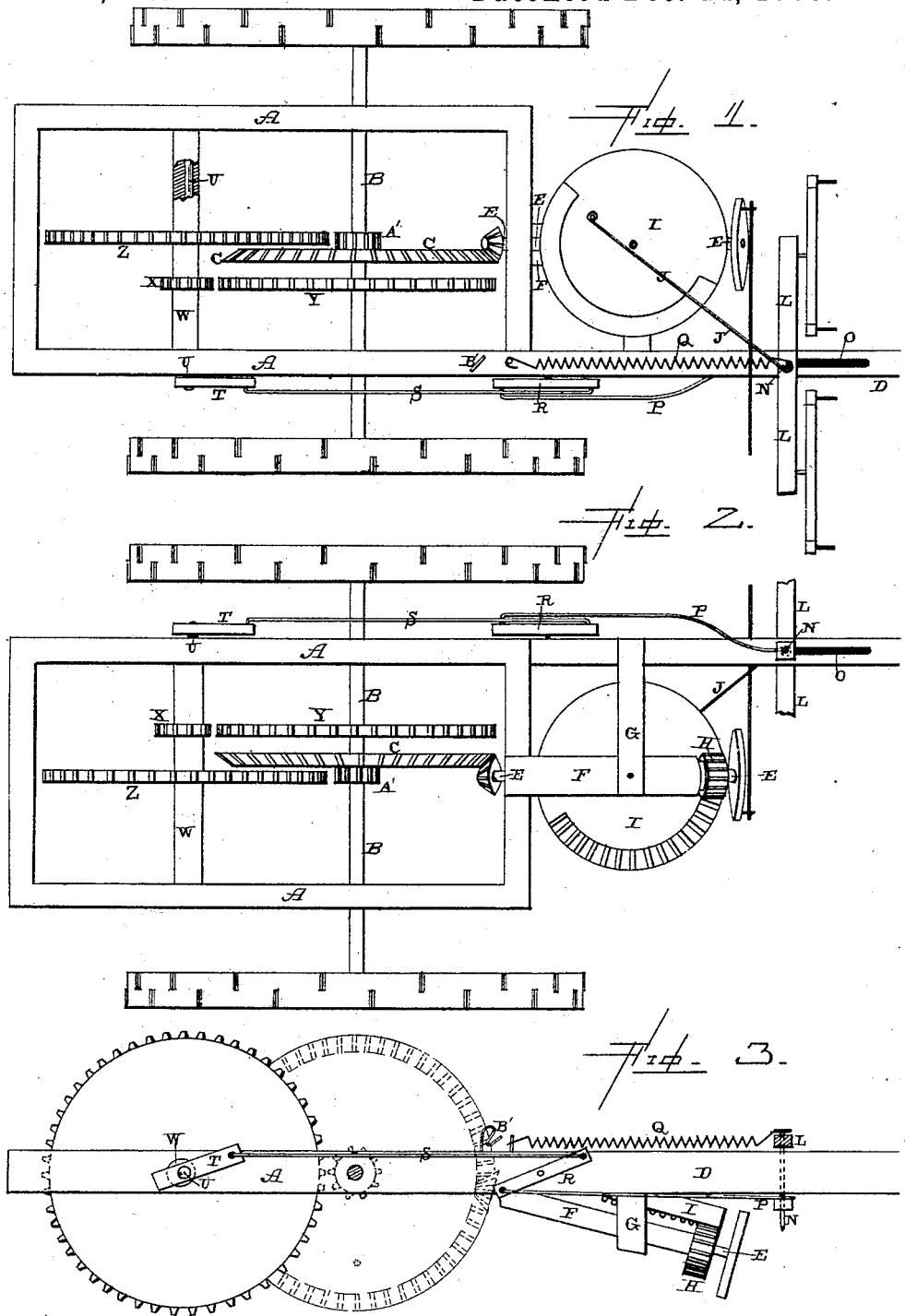
Witnesses.
L. F. Gardner
A. S. Pattison
Inventor:
Richard Butler,
per F. A. Lehmann, atty

UNITED STATES PATENT OFFICE.

RICHARD BUTLER, OF GLEN EASTON, WEST VIRGINIA.

MOWER AND REAPER.

SPECIFICATION forming part of Letters Patent No. 354,500, dated December 14, 1886.

Application filed June 14, 1886. Serial No. 205,164. (No model.)

*To all whom it may concern:*

Be it known that I, RICHARD BUTLER, of Glen Easton, in the county of Marshall and State of West Virginia, have invented certain new and useful Improvements in Mowers and Reapers; and I do hereby declare the following to be a full, clear, and exact description of the invention, such as will enable others skilled in the art to which it pertains to make and use it, reference being had to the accompanying drawings, which form part of this specification.

My invention relates to an improvement in mowers and reapers; and it consists in, first, the combination of the tongue, a double-tree which is applied thereto and has a sliding movement thereon, a spring attached to the double-tree for returning it to position when left free to move, a connecting-rod, a large wheel which has cogs extending only a portion of the way around its edge, and a pinion upon the crank-shaft which operates the sickle; second, the combination of the tongue, the spring attached to the double-tree, the large wheel provided with teeth upon one side, the crank-shaft which operates the sickle, and which is provided with a pinion to mesh with the wheel, and a series of levers or rods by means of which the parts are thrown in and out of gear, all of which will be more fully described hereinafter.

The object of my invention is to give to the sickle a number of movements, so as to cut the grass which is projecting up between the fingers before the machine starts forward, and to provide a means for throwing the mechanism in and out of gear as the machine starts forward and when it stops.

Figure 1 is a plan view of an apparatus embodying my invention. Fig. 2 is an inverted view of the same. Fig. 3 is an edge view showing one form of apparatus by means of which the parts are thrown in and out of gear.

A represents the frame of the mower or reaper; B, the axle which carries the large driving-wheel C; D, the tongue, and E the shaft, provided with a wrist-pin or crank upon its front end to drive the sickle.

A suitable bearing, F, is secured to the under side of the frame A for the shaft E to revolve in, and this bearing is supported near its front end by the brace or support G. Upon the front end of this shaft E is formed a crank or wrist-pin for operating the cutter, in the usual manner. In between the bearing F and the crank or wrist-pin on this shaft E is secured a pinion, H, which is operated by the wheel I, which is journaled upon the top of the bearing F, and which has a number of teeth formed upon one side of its lower edge for the purpose of meshing with the pinion H. Connected to this wheel I, at a suitable distance to one side of its center, is a connecting-rod, J, which is fastened at its front end to the double-tree L. This double-tree is supported by the tongue, and has a pin or bolt, N, passing from it down through the slot O, which is made through the tongue, and which bolt N has secured to it at its lower end the connecting-rod P. Secured to the rear side of this double-tree L is a spring, Q, which serves to return the double-tree to the rear end of the slot O, as soon as it is left free to move. The slot O, through the tongue, is made of sufficient length to allow the double-tree to be drawn forward far enough to move the wheel I partially around by the time the bolt N reaches the front end of the slot. As the double-tree moves forward the rod J starts the wheel around, thus causing its cogs to start the wheel H in motion before the machine starts forward. The shaft E being made to revolve before the machine starts forward, the sickle is made to cut all of that grass which is up between the fingers before any forward motion is communicated to the machine itself. When the machine does start forward, the grass between the fingers having been cut, the sickle is not clogged by this grass which was between the fingers, the starting of the machine is made much easier, and there are no stretches of grass which are left uncut, where the machine is first brought in operation. There are a sufficient number of teeth made on the under side of the wheel I to give the wheel H a suitable number of revolutions before the machine starts forward, and then those teeth on the wheel, which are still in gear with the pinion H when the pinion is started in motion by the wheel upon the axle, cause the wheel I to continue to revolve until the center of motion is passed, and thus when the double-tree is drawn back to the end of the slot by the spring Q, the wheel I moves around so as to bring its teeth again in contact with the pinion H, ready for use again.

The devices, as above described, are all that are absolutely necessary for the proper working of my invention; but as it may be desirable in some cases to throw the machinery out of gear, either at the will of the driver or when the machine starts and stops, there is connected to the lower end of the bolt N a connecting-rod, P, which is connected at its rear end to the lower end of the lever R, which is pivoted upon the side of the frame A. To the upper end of this lever R is connected a second connecting-rod, S, which is connected at its rear end to the crank T on the partially-revolving rod or shaft U, which extends across the rear end of the frame.

When the double-tree L is drawn forward by the horses as far as the slot O will permit the pin N to move, and before the machine itself begins to move forward, the connecting-rod P is exerting a pull upon the lower end of the pivoted lever R, so as to force its upper end backward, and thus cause the connecting-rod S to force the lever T backward at its upper end, and thus cause the operating-wheels of the machine to be thrown into operation. As soon as the pin N reaches the front end of the slot O, all forward motion of the double-tree L is stopped, and then the forward draft is connected directly to the large driving-wheels of the machine, the shaft W having been moved forward by the forward movement of the double-tree, the rods P S, and levers R T, the operation of the machine is continued through the main axle X, which is made to revolve as the machine starts forward. Those parts which are brought into play by the forward movement of the double-tree L in the slot O cease to operate until the machine stops, and then the spring Q draws the parts back into position ready to begin operating when the team starts forward. After the machine does start the cutter is operated in the usual manner.

The partially-revolving shaft or rod U passes through the sleeve W, to one side of the center of the sleeve, so that when the rod or shaft is turned by the crank arm or lever T, the sleeve W will be forced forward so as to bring the pinion X in contact with the large wheel Y, which is rigidly secured to the shaft B. Upon the sleeve W is also secured the large wheel Z, which meshes with the pinion A' upon the axle B. The wheels C A' are either cast in a single piece or secured rigidly together, and are placed loosely on the axle B. When the connecting-rod S is detached from the front arm or lever, R, the wheels X Z are not brought in contact with the wheels Y A', and hence the machine may be moved forward without bringing the cutting apparatus into action. When the connecting-rod S is detached at its front end from the arm or lever, the front end of the rod is held by the catch B' upon the top of the frame. When this rod is disconnected the axle revolves freely without affecting the wheels C A'.

I do not limit myself to the construction of the mechanism here shown for bringing the cutting mechanism into operation, for this may be varied at will without departing from the spirit of my invention. The mechanism here shown is one which will answer the purpose.

Having thus described my invention, I claim—

1. The combination of the shaft E, carrying the crank or wrist-pin for operating the sickle, and a pinion, H, with the wheel I, having teeth upon only a portion of its edge, a connecting-rod connected to this wheel, the double-tree, which has a sliding movement upon the tongue, and a spring for returning the double-tree to position when left free to move, substantially as shown.

2. The combination of the wheel I, having teeth upon a portion of its edge only, a connecting-rod, the sliding double-tree, a spring for returning the double-tree to position, and a mechanism, substantially as shown, connected to the double-tree for throwing the parts in and out of gear, substantially as described.

In testimony whereof I affix my signature in presence of two witnesses.

RICHARD BUTLER.

Witnesses:
 JAMES B. BONAR,
 A. D. JOHNSTON.